(12) United States Patent
Lubrano

(10) Patent No.: US 6,421,364 B2
(45) Date of Patent: Jul. 16, 2002

(54) SOLID STATE OPTICAL PUMPING LASER WITH SHIELDED LASER CAVITY INSERT

(76) Inventor: Robert W. Lubrano, 31 South Rd., Mendham, NJ (US) 07945

(*) Notice: Subject to any disclaimer, the term of this patent is extended or adjusted under 35 U.S.C. 154(b) by 64 days.

(21) Appl. No.: 09/746,520

(22) Filed: Dec. 22, 2000

Related U.S. Application Data

(63) Continuation-in-part of application No. 09/318,753, filed on May 24, 1999, now abandoned.

(51) Int. Cl.$^7$ ............................................. H01S 3/03
(52) U.S. Cl. ......................... 372/61; 372/65; 372/35; 372/72; 372/92
(58) Field of Search ....................... 372/92, 72, 34, 372/69, 70, 75, 35, 25, 61, 65

(56) References Cited

U.S. PATENT DOCUMENTS

| | | | | |
|---|---|---|---|---|
| 4,096,450 A | * | 6/1978 | Hill et al. ..................... 372/72 |
| 4,232,276 A | * | 11/1980 | Iwata .......................... 372/72 |
| 4,563,763 A | * | 1/1986 | Kuba .......................... 372/35 |
| 4,601,038 A | * | 7/1986 | Guch, Jr. ..................... 372/72 |
| 4,858,243 A | * | 8/1989 | Bar-Joseph ................... 372/72 |
| 4,894,837 A | * | 1/1990 | DiFonzo et al. ............... 372/72 |
| 4,935,938 A | * | 6/1990 | Gressly et al. |
| 5,012,481 A | * | 4/1991 | Casteleiro .................... 372/72 |
| 5,081,636 A | * | 1/1992 | Bishop ........................ 372/72 |
| 5,299,213 A | * | 3/1994 | Kuba et al. ................... 372/35 |
| 5,422,899 A | * | 6/1995 | Freiberg et al. ............... 372/35 |

* cited by examiner

Primary Examiner—Leon Scott, Jr.
(74) Attorney, Agent, or Firm—Ernest D. Buff & Associates; Ernest D. Buff

(57) ABSTRACT

Reflective powder, such as barium sulfate, within a reflector chamber of a solid-state optical pumping laser is effectively isolated from coolant-water, preventing contact therewith. Degeneration of reflectors and diminution of lasing magnitude is avoided. Water seals are shielded from substantially all light from the flashlamps by a light barrier. Ultraviolet light from the flashlamps is blocked from contacting the water seals. Degradation of the seals is eliminated; and water leakage-contact with the reflective powder is prevented.

14 Claims, 6 Drawing Sheets

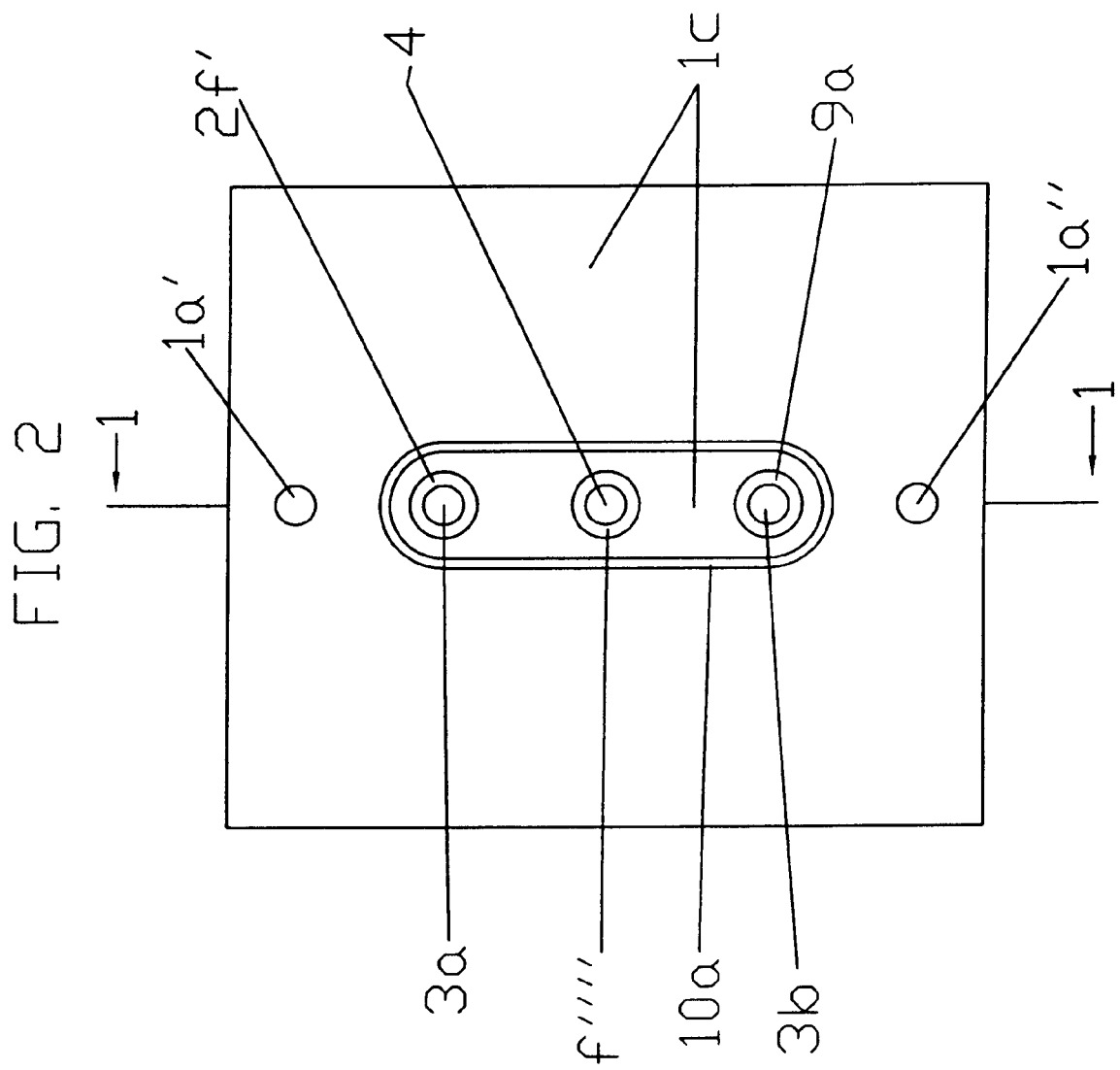

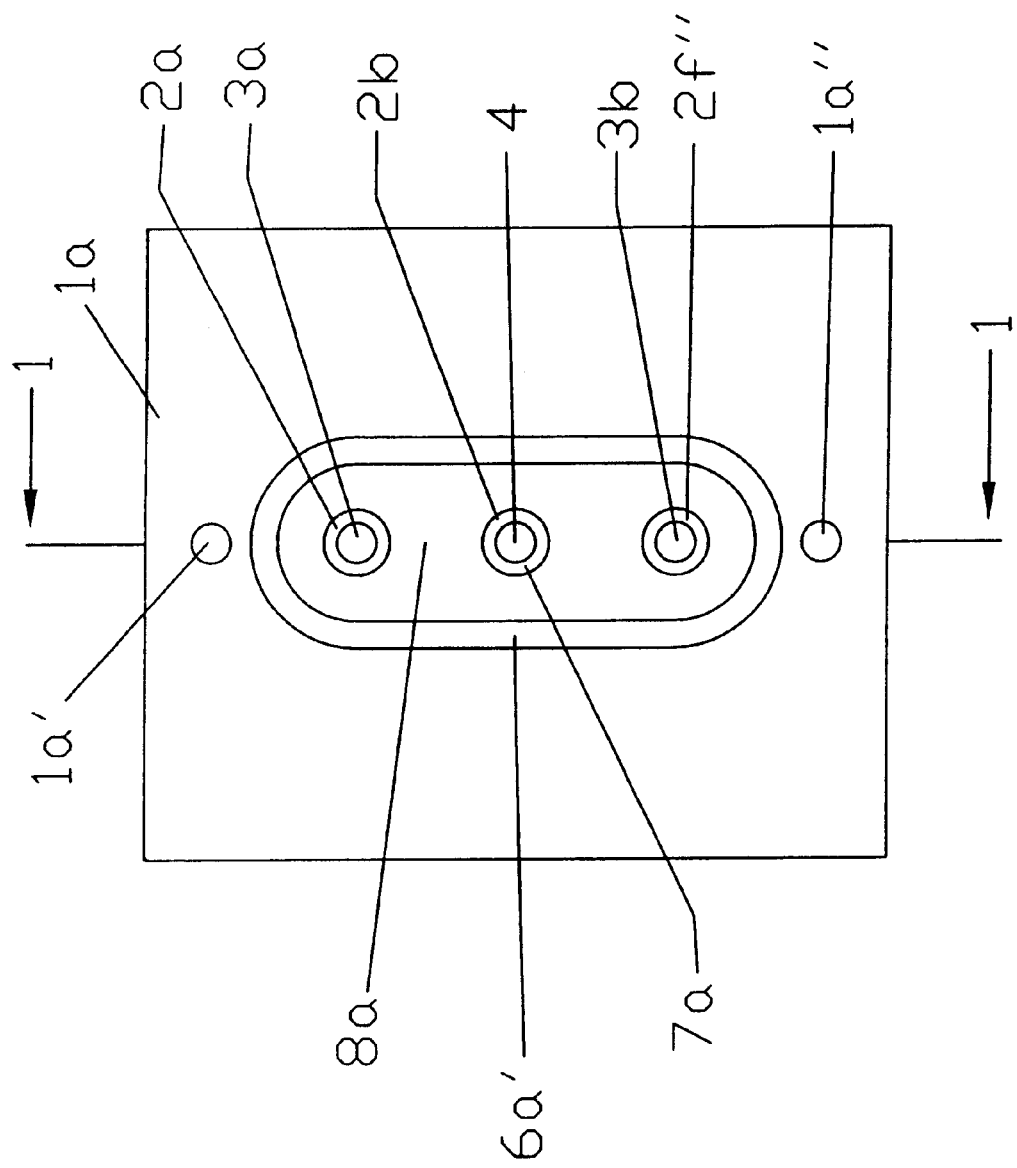

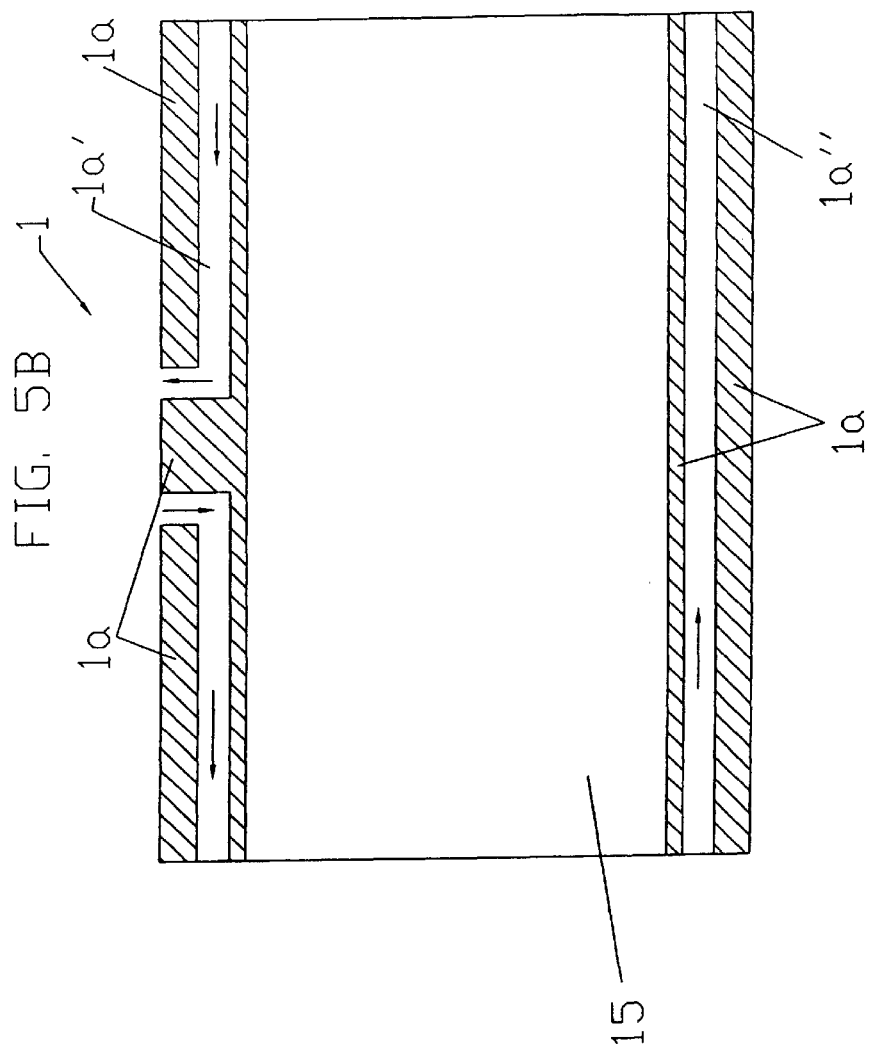
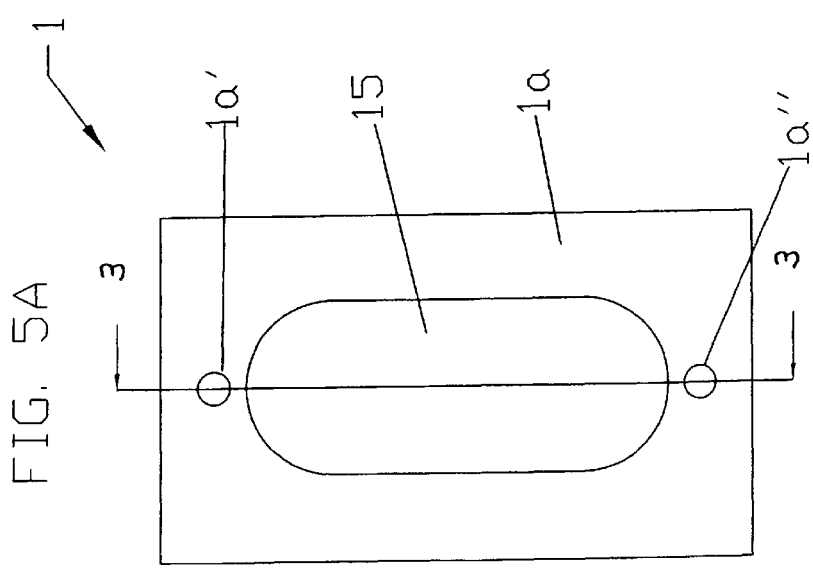

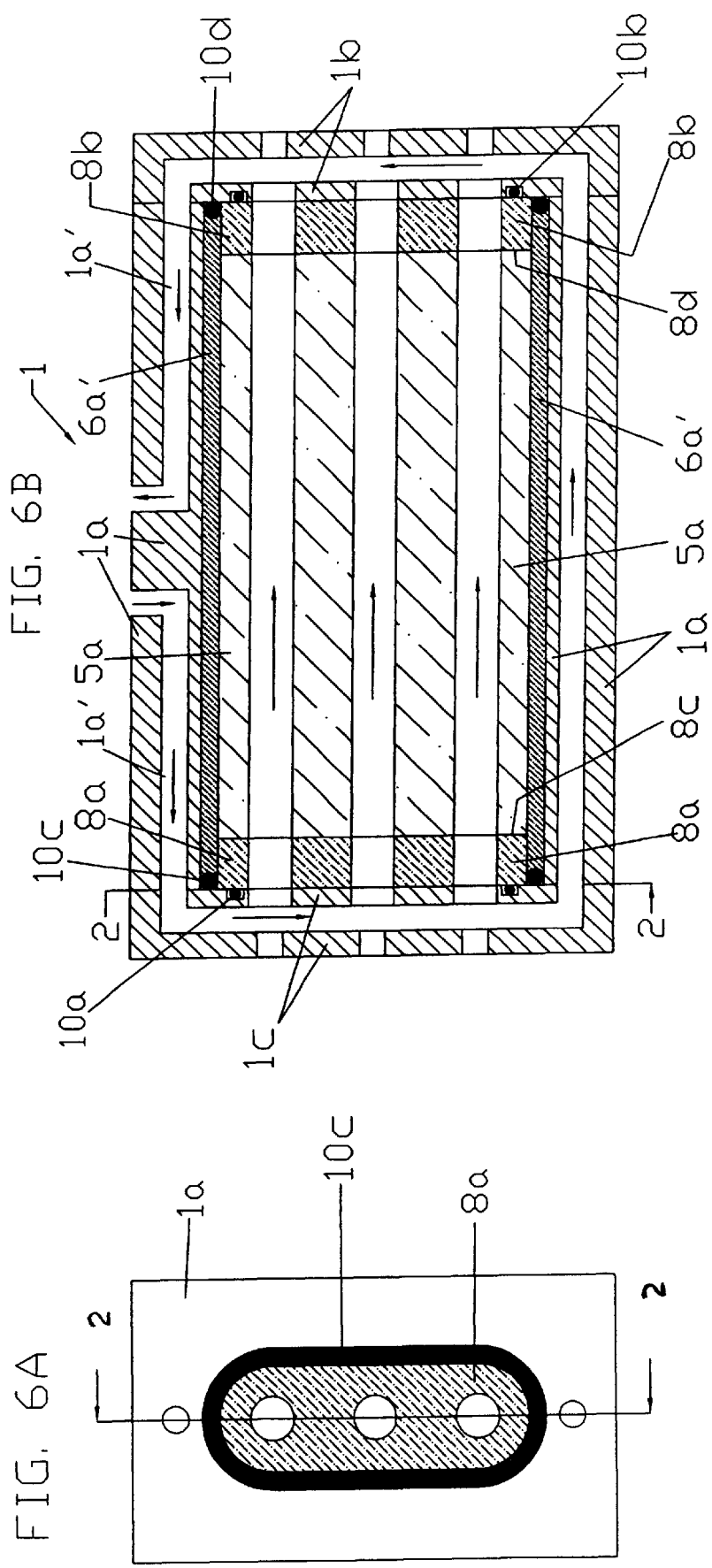

SOLID STATE OPTICAL PUMPING LASER WITH SHIELDED LASER CAVITY INSERT

CROSS-REFERENCE TO RELATED APPLICATIONS

This application is a continuation-in-part of U.S. application Ser. No. 09/318,753, filed May 24, 1999 now abandoned.

BACKGROUND OF THE INVENTION

1. Field of the Invention

This invention relates to lasers; and more particularly, to a high power, solid-state laser having a shielded laser cavity insert.

2. Description of the Prior Art

Laser producing reactors of the type upon which this invention has improved are typically solid-state optical pumping lasers wherein an alexandrite lasing medium is surrounded by transparent fused silica. The transparent fused silica is, in turn, surrounded by a reflector chamber containing a reflective powder, such as barium sulfate. One of the most troublesome problems with operation of these lasers is the tendency of coolant water to leak into the reflector chamber. Such leakage is generally occasioned when degradation of the laser's O-ring water seals permits coolant to seep past or around the seals. Once inside the reflector chamber, the coolant deteriorates the barium sulfate laser light reflectors, and prevents proper lasing of the device.

To resolve the leakage problem, it has been proposed that metal O-rings be used to enhance stability and avoid O-ring degradation. Such metal O-rings require substantial pressure to effect an appropriate seal, which can fracture the fused silica laser cavity insert wherein the laser rod and flashlamps are housed. Also proposed for this purpose were carbon seals. The carbon seals lost their compression shortly after installation. Coolant leaked around and through the seals, entered the reflector chamber and caused rapid deterioration of the reflector material, typically barium sulfate, contained therein.

Alternative structures proposed to resolve the leakage problem include use of gold or silver coated mirror reflectors (see U.S. Pat. No. 4,894,837 to DiFonzo, et al.; U.S. Pat. No. 5,422,899 to Freiberg, et al.; U.S. Pat. No. 4,232,276 to Iwata) or reflectors adapted to withstand water contact (see U.S. Pat. No. 5,299,213 to Kuba, et al.; U.S. Pat. No. 4,858,243 to Bar-Joseph). These mirror reflectors are oftentimes scratched during routine maintenance, reducing their reflectivity. In addition, water impurities tend to tarnish or deposit film on the reflectors—whether comprised of Macor ceramic material or a coated mirror-type surface—reducing lazing efficiency. Use of alternative cooling mechanisms such the heat sink taught by U.S. Pat. No. 4,096,450 to Hill, et al., result in less efficient cooling which restricts power output and efficiency of the laser. When compared to these alternate laser designs, solid state pumping lasers that are water-cooled and utilize reflector chambers packed with material such as barium sulfate, have retained popularity, especially for high-power laser applications.

A major contributor to O-ring seal deterioration in water-cooled lasers is the ultraviolet light produced during pumping of the flashlamps as the laser rod is caused to laze. In order to optically pump the laser to peak power at which the flashlamps cause the laser rod to laze and otherwise perform, a reflector is required. The reflector is typically created by packing barium sulfate as a reflector within a reflector chamber, formed between the internal facing of a laser cavity housing and the periphery of the laser cavity structure. The barium sulfate reflector intensifies the light produced by the high intensity flashlamps. It also causes rapid degradation of water seals, including the O-ring seals, and leakage of coolant water therethrough. The leaking water seeps into the reflector chamber, deteriorating the barium sulfate reflector and impairing operability of the laser.

There remains a need in the art for a solid-state optical pumping laser which can be run at high power in an efficient, reliable manner. Particularly needed is a solid-state optical pumping laser that can be efficiently cooled without degradation of water seals and reflector deterioration.

SUMMARY OF THE INVENTION

The present invention provides a solid state optical pumping laser which can be pumped to high power and run at that high power level for a prolonged period of time in an economical, efficient and highly reliable manner. Generally stated, the solid-state optical pumping laser has a housing (referred to hereinafter as laser pump chamber) for defining a cavity containing a laser light producing space and a coolant flow space. The pumping chamber casing has at least one channel therewithin for coolant flow contiguous with the light-producing space. At least one flashlamp is operatively mounted within the light producing space. Mounted on the pumping chamber casing exterior to the coolant flow space and to the light producing space is at least one laser rod composed of non-conductive, crystalline material. The pumping chamber further includes a reflective material composed of a major amount of barium sulfate for reflecting flashlamp light into the laser rod to maximize reflected flashlamp concentrated light. A coolant structure having at least one coolant flow-channel is provided for directing water-containing coolant to and from the coolant flow space. The pumping chamber has a sealing means for isolating the reflective material from coolant within said coolant flow space. Such sealing means includes at least one water barrier seal for physically sealing the coolant flow space against leakage of the water-containing coolant to thereby prevent coolant contact with the reflective material. Protection against deterioration caused by contact with the water-containing coolant is thereby afforded to the reflective material. A barrier means blocks substantially the entire amount of ultraviolet radiation emitted by the flashlamp from contacting the sealing means. The barrier means thereby prevents deterioration of the sealing means caused by exposure to the ultraviolet radiation.

More specifically, the invention provides a solid-state optical pumping device wherein reflective surfaces are effectively isolated from the coolant water, preventing contact of coolant-water with the barium sulfate powder. Degeneration of reflectors and diminution of lasing magnitude is eliminated. The water seals are shielded from substantially all light (including ultraviolet light) from the flashlamps by at least one and preferably a plurality of ultraviolet radiation barriers. With this arrangement, ultraviolet light from the flashlamps is prevented from striking the water seal(s), such as the O-ring water-leakage barriers; and water leakage-contact with barium sulfate powder extant within the reflector chamber is avoided.

In a first preferred embodiment, an ultraviolet radiation barrier comprises at-least a major and effective amount of opaque fused silica. Such opaque fused silica is present in an amount and a thickness sufficient to substantially block passage of ultraviolet radiation therethrough. With this arrangement, deterioration of the water barrier seal is substantially completely prevented, or is reduced at-least to a degree sufficient to prevent leakage of water-containing coolant in an amount sufficient to reach and destroy or degrade the barium sulfate reflector.

Preferably, the ultraviolet radiation barrier comprises a substantially linearly extending rigid sheet. More preferably, the substantially rigid sheet is composed of opaque fused silica. The ultraviolet radiation barrier can further include at-least an amount of opaque fused silica sufficient to block ultraviolet radiation from contacting the sealing means. At-least two separate spaced-apart sections of the ultraviolet radiation barrier are positioned, respectively, at an inlet end and an outlet end of an at-least one lamp mounting and coolant flow space and of an at least one substantially laser rod enclosing and coolant flow space. The ultraviolet radiation barrier includes at-least one through-space opening disposed in alignment with at least one of the inlet end and the outlet end of the lamp mounting and coolant flow space and the laser rod enclosing and coolant flow space.

The ultraviolet radiation barrier can also comprise at least two spaced-apart, substantially linearly extending sheets. One of the sheets is thermally fused to a cavity structure adjacent to the inlet end. Another of the sheets is thermally fused to the cavity structure at the outlet end. Preferably, each of the ultraviolet radiation barriers comprises a substantially linearly extending sheet. More preferably, each of the linearly extending sheets is composed of fused silica.

Each of the ultraviolet radiation barriers includes at-least one portion alignable with at least a portion of light producing and coolant flow spaces. In addition, the ultraviolet radiation barriers are positioned, respectively, at an inlet end and an outlet end of the light producing and coolant flow space and the laser rod enclosing and coolant flow space. The ultraviolet radiation barriers include at-least one through-space opening disposed in alignment with the inlet end and the outlet end of the light producing and coolant flow space and the laser rod enclosing and coolant flow space.

The ultraviolet radiation barrier preferably comprises at-least two spaced-apart substantially linearly extending sheets. One of the sheets is thermally fused to cavity structure adjacent to the inlet end. Another of the sheets is thermally fused to cavity structure at the outlet end. A major and effective amount of glass-to-metal sealing and low expansion alloy, such as Invar, molybdenum and the like, having a coefficient of thermal expansion substantially the same as glass, is contained by the barrier. Whether the spaced-apart substantially linearly extending sheets of which the ultraviolet radiation barrier is comprised are formed from glass-to-metal sealing and low expansion alloy or are formed from opaque fused silica glass, they are in each case thermally fused to the transparent fused silica cavity structure.

The amount and thickness of the glass-to-metal sealing and low expansion alloy is sufficient to substantially block the ultraviolet radiation. With this arrangement, the water barrier seals are precluded from deteriorating; and leakage of water-containing coolant in an amount sufficient to reach and destroy the barium sulfate reflector is prevented. The seal is preferably composed of cerium-doped glass having a thickness sufficient to substantially block passage of ultraviolet radiation therethrough. The shield thus provided prevents deterioration of the water barrier seal which, in turn, prevents leakage of water-containing coolant into the reflector chamber in sufficient amount to reach and diminish the reflective characteristics of the barium sulfate powder.

The at-least a major and effective amount of aluminum oxide ceramic preferably has a density ranging from about 3.7 to 3.8 grams per cubic centimeter. Aluminum oxide ceramic is present in an amount and thickness sufficient to substantially block passage of the ultraviolet radiation therethrough. The water barrier seal is thereby precluded from becoming deteriorated, and remains operative to prevent leakage of water-containing coolant into the reflector during extended pumping of the laser for a prolonged period of time. In an alternative embodiment of the invention, the aluminum oxide ceramic is replaced by molybdenum, present in an amount and thickness that passage of ultraviolet radiation through the ultraviolet radiation barrier is substantially prevented.

At least a major and effective amount of smokey quartz can, alternatively, be employed in place of the molybdenum. The amount and thickness of smokey quartz used is sufficient, in combination, to substantially block passage of the ultraviolet radiation through the barrier. Use of the ultraviolet radiation barrier prevents deterioration of the water barrier seal and leakage of water-containing coolant in an amount sufficient to reach and destroy barium sulfate reflector.

Significant structural and operational advantages are incorporated into the elements of this invention. Cooling efficiency is optimized and sealing of the reflectors is accomplished in a highly reliable manner. Leakage of coolant around and through the water seals is virtually eliminated. The reflector is isolated from leakage of coolant water and ultraviolet light is blocked from reaching the water coolant seals. Degradation of the water seals is minimized and the laser rod and flashlamps are efficiently and reliably cooled. Lasing is effected at higher efficiency and with less disruption than solid state pumping lasers in which barium sulfate is cooled by a heat sink, or in which water contacts gold, ceramic or silver reflectors.

BRIEF DESCRIPTION OF THE DRAWINGS

The invention will be more fully understood and further advantages will become apparent when reference is made to the following detailed description of the preferred embodiments of the invention and the accompanying drawings wherein:

FIG. 2 is a section taken along lines 2—2 of FIG. 1, showing a water-sealing O-ring appointed for protection against degrading ultraviolet radiation;

FIG. 3 is a section taken along lines 3—3 of FIG. 1, showing an opaque fused silica radiation barrier, a pair of flashlamps, a laser rod, water channels, and a barium sulfate reflector in relation to the laser cavity housing;

FIG. 5a is a sectional view of one end of the laser cavity housing shown in FIG. 1;

FIG. 5b is a sectional view of the laser cavity housing showing the pump chamber cavity;

FIG. 6a is a section of the laser pump chamber taken along the line 2—2 of FIG. 6b, and showing a barrier shield in relation to the sealing means and the laser cavity housing; and FIG. 6b is a sectional view of the laser pump chamber, showing the shielded laser cavity insert, O-rings, coolant water channels, reflector chambers and end caps.

DETAILED DESCRIPTION OF THE INVENTION

Figure 1:
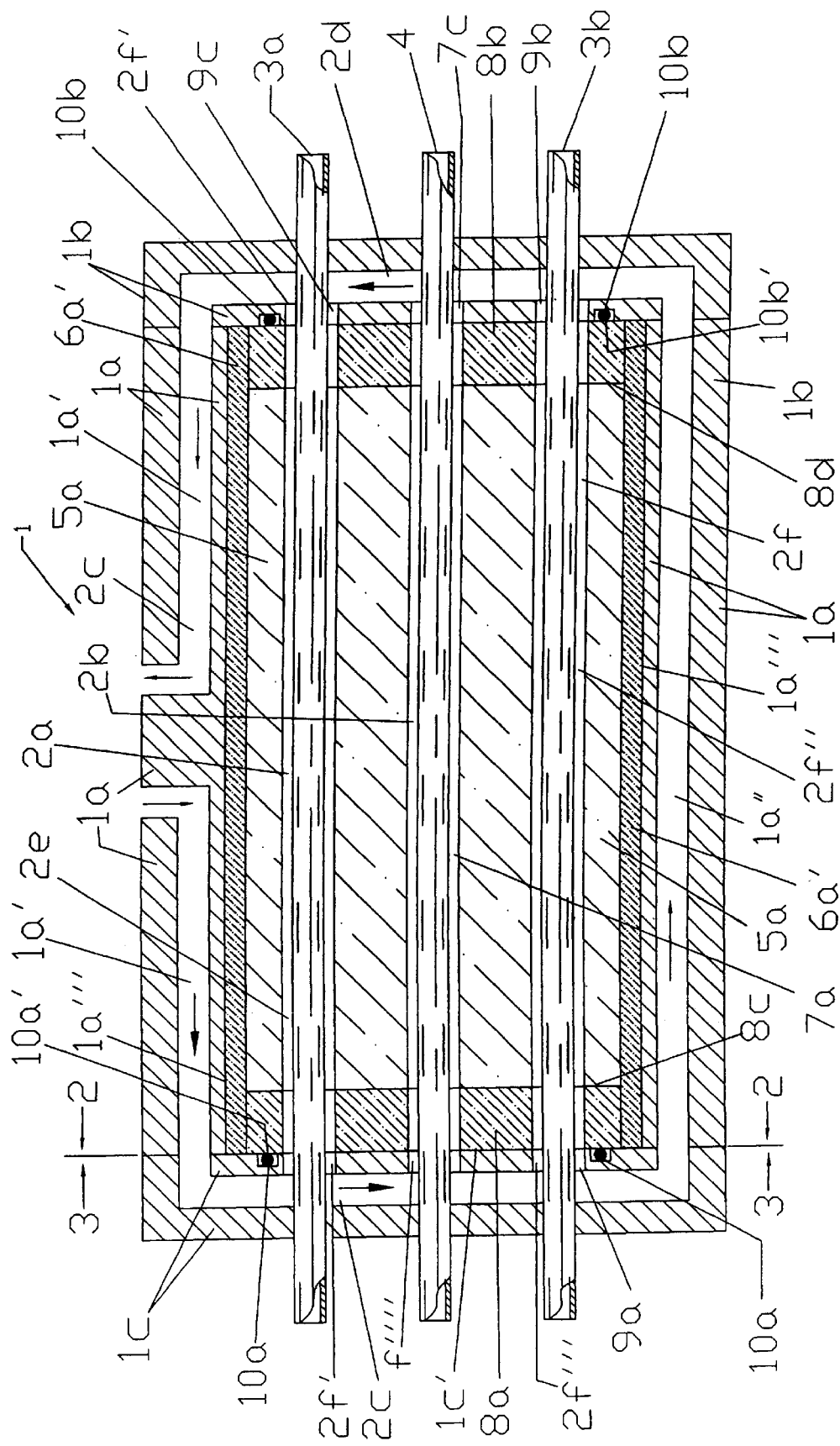
FIG. 1 is a section taken along lines 1—1 of FIG. 2, and illustrating opaque shields thermally fused to the ends of a transparent piece of fused silica to thereby form a laser cavity insert for the laser pump chamber of an optical pumping laser unit that incorporates the present invention, the thermally fused shields constituting ultraviolet radiation barriers positioned between the flashlamps and the water-sealing O-rings to shield the O-rings from the flashlamp radiation.

Many structural components are conventional in solid state pumping lasers. Representative of these components are reflective mirror surfaces, shutters, Q-switches, coolant-water seals disposed in portions of structure not pertinent to the problems to which this improvement invention is directed. These components though alluded to briefly are not discussed hereinafter in detail, nor depicted by the drawings. They form no part of the present invention, and are unrelated to the problem which it solves.

Referring to the drawings, there is shown, generally at 1, the laser pump chamber of a high-powered pumping laser designed to perform for an extended period of time without need of maintenance and consequent down time. As shown by FIG. 5, the laser pump chamber 1 has a machine chamber inside the laser cavity housing 1a that accommodates a diffused reflector and laser cavity insert (not shown).

The laser cavity insert houses the laser rod 4, (shown at FIGS. 1 and 2) flashlamps 3a, 3b, and coolant-water flowing within channels 2e, 2b, 2f in the direction of the arrows. Outside contour 1a''' is used to shape the diffused reflector's surface 6a', which is preferably composed of barium sulfate.

The laser pump chamber 1 described hereinabove performed when tested at full power. It exhibited excellent beam quality. However, after approximately twenty-four hours, the "O" rings 10a and 10b that seal the water flow used to cool the laser rod 4, and flashlamps 3a and 3b became degraded due to radiation from the flashlamp light. Cooling water entered the reflector cavity that houses the barium sulfate 6a'.

The wetting of the reflector powder 6a', in this case barium sulfate, diminished the ability of the powder 6a' to reflect light and the efficiency of the laser was markedly reduced. In accordance with the present invention, problems presented by degrading of the "O" rings, shown in FIG. 1 at 10a and 10b, were overcome by shielding the ends of the laser cavity insert 5a, which is formed from transparent fused silica. The shielding was effected using shields 8a, 8b formed from opaque fused silica. For convenience, the components 8a, 8b, 5a will sometimes be referred to as shielded laser cavity insert 8a, 8b, 5a. Advantageously, the shielded laser cavity insert has impervious seams 8c, 8d. Together with the other components of the laser pump chamber 1, the shielded cavity insert represents a unique combination that provides laser pump chamber 1 with significant performance advantages.

The shielded laser cavity insert is made of one piece of transparent fused silica 5a and two pieces of opaque fused silica 8a, 8b. Especially suited for use in constructing the fused silica parts 5a, 8a, 8b, is a glass member selected from the group consisting of glasses designated Supercil, Dynacil and Corning 7940. These glasses have a high degree of purity, preferably at least about 99.99 percent, and are not subject to being degraded by ultraviolet light. A glass having a lower impurity level would become discolored as impurities are burned therein by the ultraviolet light, causing degradation thereof. Each of these components is sized and shaped by a preliminary machining process. The components 5a, 8a, 8b are then placed in a kiln or furnace and heated to between 760 and 820 degrees C. As used herein, this process is referred to as thermal fusing. The three parts 5a, 8a, 8b are fused into a monolithic structure, impermeable at the seams. In addition, the structure has transparent fused silica 5a sandwiched between the two pieces of opaque silica 8a, 8b.

Apertures 2e, 2b, 2f (shown in FIG. 4a) are drilled lengthwise through the structure to house one or more flashlamps, depending upon the size of the shielded laser cavity insert. Another aperture, drilled lengthwise through the structure houses a laser rod. These apertures also permit water having a temperature of approximately 100° C. to flow around the flashlamps 3a, 3b and the laser rod 4. Typically, water pressure inside the shielded laser cavity insert is about 25–40 pounds per square inch. Laser rod 4 is a non-conductive solid rod of crystalline material, such as alexandrite, and is the active medium. The laser rod 4 is excited by the intense light from the flashlamps 3a, 3b, which process is herein referred to as optical pumping. The reflector 6a', composed of a reflective powder such as barium sulfate, enhances optical pumping, causing the rod 4 to laze.

The shielded laser cavity insert 5a, 8a, 8b is finish machined and optically polished to a specific geometry. Machining, fusing, and polishing are conventional processes in the fabrication of fused silica (glass).

The shielded laser cavity insert 5a, 8a, 8b prevents substantially all flashlamp light from escaping through its opaque end shields 8a, 8b. In addition, it prevents water from escaping the two seams extant between the transparent fused silica 5a and the two opaque fused silica end shields 8a, 8b.

The above-described insert 5a, 8a, 8b has been designed for use in the laser pump chamber 1 of a solid-state pumping laser. The laser pump chamber 1 is comprised of a laser cavity housing 1a and two metal end caps 1b, 1c. Collectively, the laser cavity housing 1a and metal end caps 1b, 1c form a laser pump chamber 1 that houses the shielded laser cavity insert containing laser rod 4 and flashlamps 3a, 3b, reflector 6a', circulating cooling liquid, and "O" rings 10a, 10b. The "O" rings 10a, 10b are necessary to prevent the flow of the cooling liquid from flowing into the reflector powder comprising reflector 6a'. Such reflector powder is packed around the periphery of the shielded laser cavity insert 8a, 8b, 5a.

The opaque end shields 8a, 8b of the shielded laser cavity insert prevent flashlamp light from making contact with the "O" rings 10a, 10b. Absent the shielding action provided by end shields 8a, 8b, the flashlamp light would degrade the "O" rings 10a, 10b, permitting coolant-water to leak into the reflector chamber 6a'. Once inside the reflector chamber, the coolant-water would contact the reflective powder, reducing its reflective qualities. This, in turn, would adversely affect lasing efficiency, with the result that laser power would be diminished.

In FIG. 6b there is shown O-rings 10c, 10d, disposed around the periphery of the opaque fused silica end shields 8a, 8b, respectively. The O-rings 10c, 10d can be used in lieu of or together with O-rings 10a, 10b to prevent leakage of coolant-water into the reflector chamber 6a'.

Generally stated, the laser pump chamber 1 of the solid-state optical pumping laser has a housing 1a, typically composed of aluminum, and referred to herein as the laser cavity housing, for defining a cavity 15 containing a laser light producing space 2a and a coolant flow space 2c. The pumping chamber casing has at least one channel 2e therewithin for coolant flow contiguous with the laser light-producing space 2a. At least one flashlamp (and preferably a plurality of flashlamps 3a, 3b) is operatively mounted within the laser light producing space 2a. Mounted on end caps 1b, 1c of the laser pump chamber 1 exterior to the coolant flow space 2c and to the laser light producing space 2a is at least one laser rod 4 composed of non-conductive, crystalline material, such as alexandrite. The laser pump chamber 1 further includes a reflective material 6a' composed of a major amount of barium sulfate for reflecting flashlamp light into the light producing space 2a to maximize reflected flashlamp concentrated light. A coolant structure having at-least one coolant flow-channel 1a', 1a", 2c, 2d is provided for directing water-containing coolant to and from the coolant flow space. The laser pump chamber 1 has a sealing means 10a, 10b for isolating the reflective material from coolant within the coolant flow space 1a', 1a", 2c, 2e, 2f'', 7a. Such sealing means includes at least one water barrier seal 10a for physically sealing the coolant flow space against leakage of the water-containing coolant to thereby prevent coolant contact with the reflective material 6a'. Protection against deterioration caused by contact with the water-containing coolant is thereby afforded to the reflective material 6a'. A barrier means 8a, 8b blocks substantially the entire amount of ultraviolet radiation emitted by the flashlamp 3a from contacting said sealing means 10a, 10b. The barrier means 8a, 8b thereby prevents deterioration of the sealing means 10a, 10b caused by exposure to the ultraviolet radiation.

Preferably, the laser pump chamber 1 comprises laser cavity housing (shown at 1a in FIGS. 5a and 5b) in which are formed coolant channels 1a', 1a" by drilling or other suitable machining procedure; and end caps 1b, 1c having O-ring glands for receiving O-rings 10a, 10b. That cavity structure forms a light producing space 2e, 2f and laser rod coolant space 2b and coolant channeling flow spaces 2a, 7a, 2f'' via flashlamp and laser rod channel flow entrances 2f', 2f''', f'''' and channel flow exits 9b, 7c, 9c for the flashlamps 3a, 3b and the laser rod 4, in continuous flow with one another during operation. Operatively mounted within the flashlamp space 2a, 2f are flashlamps 3a and 3b. A laser rod 4 composed of non-conductive crystalline material, such as alexandrite, is disposed in the laser rod space 2b continuous with the flashlamp space 2e, 2f (shown in FIG. 4a). Mounted interior to the coolant flow spaces 1a', 2c, 1a", 2d, 2c and exterior to the laser light producing space 2b is transparent casing structure 5a which, together with the inner face of the laser cavity housing 1a, forms a reflector chamber containing a reflective material 6a'. That cavity-forming transparent fused silica casing structure 5a forms laser light producing space 2b, laser coolant space 7a and coolant flow channeling flow spaces f'''', 7c, 9a, 9b, 9c, 2f. The flashlamp and laser rod channel flow entrances 2f', f'''', 2f''' and channel flow exits 9c, 9b, 7c for the flashlamps and the laser rod 4 place the coolant flow channeling flow spaces 2c, 2d in continuous flow with one another during operation. Fixedly mounted within the flashlamp spaces 2e, 2f, are flashlamps 3a, 3b. Laser rod 4, composed of a non-conductive crystalline material, is disposed in laser rod spaces 2b. Disposed within laser cavity 15 (shown in FIG. 5b) is a shielded laser cavity insert comprising a transparent fused silica block 5a, and opaque fused silica and shielded blocks 8a, 8b. An additional space, which is isolated from coolant, is formed by structures 1a''' and 5a. Contained within the coolant isolated space formed by structures 1a''' and 5a is the reflective material 6a' and 6b', such as barium sulfate.

The reflective material 6a' is positioned to reflect flashlamp light until it is eventually absorbed by the laser rod 4. Deterioration of the barium sulfate reflector has previously occurred as a result of leakage of coolant water into the reflector chamber and into contact with the barium sulfate reflector. In accordance with the present invention, such leakage is virtually eliminated, and deterioration of the reflective material is prevented.

The foregoing elements are positioned so that the flashlamps 3a, 3b cast light onto the laser rod 4, causing the non-conductive crystalline material of which it is composed to generate laser light. To maximize an intense emittance-level of laser light, the emitted but unabsorbed flashlamp light is redirected by reflection, causing its eventual absorption. The reflected light is at least in part added to light that is continuously emitted by flashlamps 3a, 3b. In this manner, the total quantum of light appointed for absorption by laser rod 4 is markedly increased.

As previously noted, the opposing spaced-apart reflective surfaces of the reflective material are substantially parallel to the non-conductive crystalline-material laser rod. These reflective surfaces, like the remainder of the reflective material are preferably composed of barium sulfate. Within the pumping chamber are coolant-water channels that direct coolant past the coolant flow spaces 2c, 2d, 2e and 2f'''. The reflective material must be isolated from coolant-water flowing within the laser light producing flow space 2e and non-light producing coolant flow spaces 2c, 2d, 1a', 1a''. A sealing means 10a, 10b, comprising at least one water barrier seal such as an O-ring seal is positioned to physically seal the reflector chamber containing the reflective material 6a' against coolant-water leakage from all coolant water entering and exiting the shielded laser cavity insert 8a, 8b, 5a. The sealing means 10a, 10b prevents coolant-water from leaking into the reflector chamber and into contact with the reflective material 6a'. Degradation of the sealing means 10a, 10b owing to contact with flashlamp light, and especially the ultraviolet radiation contained therein, causes coolant-water to leak into the reflector chamber. Once inside the reflector chamber, the water contacts and deteriorates the reflective material 6a', reducing its reflective capacity.

The search for a water barrier seal capable of providing long-term protection to the barium sulfate reflective material has produced numerous sealing means designs and compositions. These designs and compositions, though oftentimes complex and costly, have not been successfully employed to bar leakage of coolant water into contact with the reflective material.

In accordance with the present invention, a barrier means, composed of opaque fused silica ultraviolet radiation barriers 8a, 8b, respectively, are positioned along thermal fuse lines 8c, 8d at opposite ends of the transparent fused silicate casing, as illustrated in FIG. 1. Each of ultraviolet radiation barriers 8a, 8b is appropriately placed to block flashlamp light, with emitted ultraviolet radiation, from contact with the water barrier seals 10a, 10b. The ultraviolet radiation barriers 8a, 8b comprise opaque fused silica present in an amount and thickness sufficient to substantially block transmission of seal-deteriorating radiation, such as ultraviolet light, therethrough. As such, the water barrier seals 10a, 10b and inward faces 10a' and 10b' are precluded from significant deterioration due to ultraviolet light. Without degradation, the opaque fused silica barrier means remains operative to prevent leakage of water into the reflector chambers for a prolonged period of time. During high power operation, for example, the barrier means and sealing means collectively cooperate to prevent such coolant-water leakage for a time period ranging up to three years or more. Provided the laser is properly maintained, the collective cooperation between the barrier means and the sealing means enables the laser cavity insert to remain operable for an extended time period that is considerably longer.

Preferably, the barriers 8a, 8b are opaque. They resist transmission of light so that substantially all flashlamp light, including ultraviolet light is barred from passage therethrough. This opaque quality of the barrier means is achieved by the presence of a plurality of substantially homogeneously disbursed microscopically sized bubble-spaces, or air bubbles, distributed within and throughout the opaque fused silica body.

In the broad invention and preferred embodiments thereof, the ultraviolet light radiation barriers are illustrated as spaced-apart barriers 8a, 8b. Preferably, each of the barriers 8a, 8b comprises a barrier material selected from the group consisting of fused silica, cerium-doped glass, aluminum oxide ceramic having a density of about 3.7 to about 3.8 grams per cubic centimeter, molybdenum and smokey quartz, present in an amount sufficient to block substantially the entire light from the flashlamps from contact with the sealing means. Such barrier means 8a, 8b is thermally fused to the transparent fused silica part 5a to produce a monolithic structure impermeable at the seams. In that structure the transparent fused silica part 5a is sandwiched between the two opaque silica skills 8a, 8b.

Figure 4B:
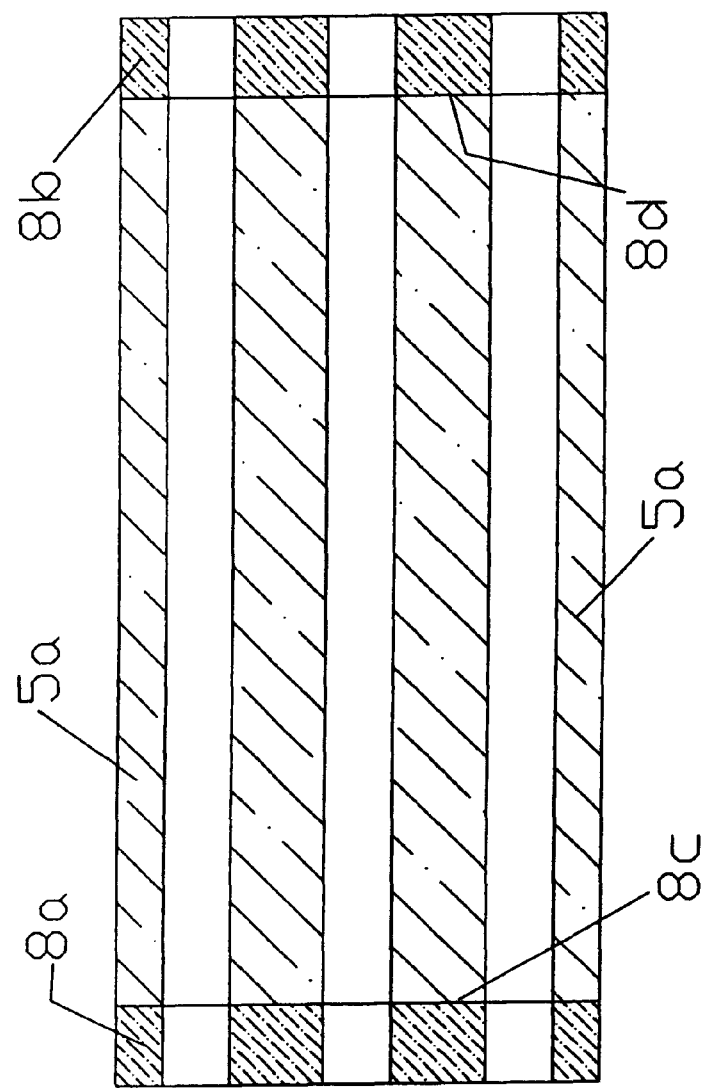
FIG. 4b is a sectional view of the shielded laser cavity insert shown in FIG. 1.
Figure 4A:
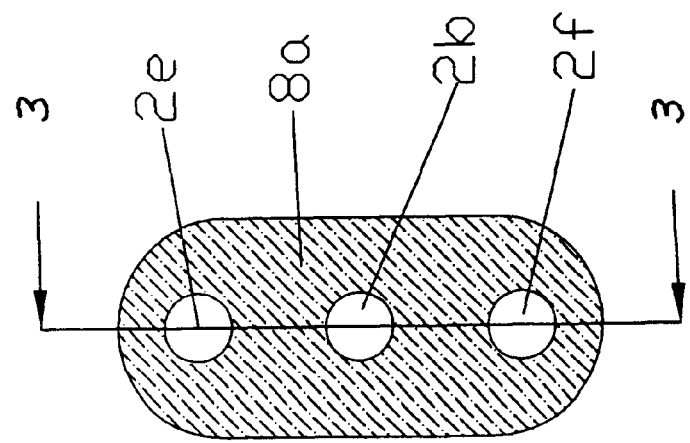
FIG. 4a is a section taken along the lines 3—3 of FIG. 1, showing a barrier shield composed of opaque fused silica.

Although the ultraviolet radiation barriers, best shown by FIGS. 4a and 4b, have been illustrated as substantially linearly extending sheets, such ultraviolet radiation barriers are not restricted to any particular shape. As shown, the ultraviolet radiation barriers have spaces extending therethrough and aligned to accommodate laser rod 4 and flashlamps 3a, 3b.

Preferably at least one of the ultraviolet radiation barriers 8a, 8b is a substantially rigid sheet of opaque fused silica. In a second preferred embodiment of the barrier means, the barriers 8a, 8b comprise a composition selected from the group consisting of cerium-doped glass, glass-to-metal sealing and low expansion alloy, aluminum oxide ceramic, molybdenum and smokey quartz.

It is also preferred to employ at least two separate spaced-apart ultraviolet radiation barriers 8a, 8b of which the barrier means is comprised. These barriers 8a, 8b are preferably positioned so that inlet apertures 2f', f'''', 9a and outlet apertures 9b, 7c, 9c are aligned with coolant flow passages 2b, 2e, 2f. That is to say, the inlet aperture 2f' and outlet aperture 9c are positioned in alignment the pumping chamber's lamp mounting and coolant flow space 2e to thereby align end cap 1c with shielded laser cavity insert 8a, 5a, 8b. Inlet aperture f'''' and outlet aperture 7c are disposed in alignment with the laser rod enclosing and laser rod coolant flow space 2b of the laser pump chamber housing 1 to thereby align end caps 1b, 1c with shielded laser cavity insert 8a, 5a, 8b. The ultraviolet radiation barrier further includes at least one coolant flow space 2f'' disposed in alignment with at least one of the inlet end 9a and the outlet end 9b of the lamp mounting and coolant flow space 2f.

In FIGS. 2 and 3, there are illustrated views of the solid-state optical pumping laser. FIG. 2 depicts the water sealing O-ring 10a in relation to the water channels 1a', 1a'', 2f', f'''', 9a, flashlamps 3a, 3b, and laser rod 4, as viewed toward the face of end cap 1c. In FIG. 3 there is shown the fused silica shield in relation to the barium sulfate reflector 6a.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A solid state optical pumping laser, comprising:
   a. a housing comprising a single piece of transparent fused silica for defining a cavity containing a laser light producing space and a coolant flow space;
   b. at least one channel for coolant flow contiguous with the laser light-producing space;
   c. at least one flashlamp operatively mounted within the laser light producing space;
   d. at least one laser rod composed of crystalline material, and mounted on said housing exterior to said coolant flow space and to said light producing space;
   e. a reflective material composed of reflective powder for reflecting flashlamp light into the laser rod to maximize reflected flashlamp concentrated light;
   f. a coolant structure having at-least one coolant flow-channel of directing water-containing coolant to and from the coolant flow space;
   g. sealing means for isolating said reflective powder from coolant within said coolant flow space, said sealing means including at least one water barrier seal for physically sealing said coolant flow space against leakage of said water-containing coolant to thereby prevent coolant contact with said reflective powder, whereby said reflective powder is protected against deterioration caused by contact with said water-containing coolant; and
   h. barrier means for blocking substantially the entire amount of ultraviolet radiation emitted by said flashlamp from contacting said sealing means, whereby said deterioration of said sealing means caused by exposure to said ultraviolet radiation is prevented.

2. A solid state optical pumping laser as recited by claim 1, wherein said barrier means comprises as opaque fused silica present in an amount and thickness sufficient to block substantially the entire amount of said ultraviolet radiation, whereby degradation of said sealing means is minimized, and leakage of water-containing coolant therethrough and into contact with said reflective powder is substantially prevented.

3. A solid state optical pumping laser as recited by claim 2, wherein said barrier means comprises a substantially rigid sheet of opaque fused silica.

4. A solid state optical pumping laser as recited by claim 3, wherein said water barrier seal comprises an O-ring, and said barrier means comprises opaque fused silica present in an amount sufficient to block ultraviolet radiation from contacting said O-ring.

5. A solid state optical pumping laser as recited by claim 4, wherein said barrier means includes:
   a. at least two separate ultraviolet radiation barriers, positioned respectively at an inlet end and an outlet end of said lamp mounting and coolant flow space and the laser rod enclosing and coolant flow space; and b. at least one through-space opening disposed in alignment with the inlet end and the outlet end of the lamp mounting and coolant flow space and the laser rod enclosing and coolant flow space.

6. A solid state optical pumping laser as recited by claim 5, wherein said barrier means comprises at least two spaced-apart substantially linearly extending sheets, a first of the sheets being sealably attached to cavity forming structure adjacent to said inlet end and a second of said sheets being sealably attached to cavity structure at said outlet end.

7. A solid state optical pumping laser as recited by claim 3, wherein said water barrier seal comprises an O-ring, and said barrier means comprises opaque fused silica present in an amount sufficient to block substantially all flashlamp light from contacting said O-ring.

8. A solid state optical pumping laser as recited by claim 1, wherein said barrier means comprises at least one ultra-violet radiation barrier disposed in alignment with said rod enclosing and coolant flow space.

9. A solid state optical pumping laser as recited by claim 1, wherein said barrier means comprises a cerium-doped glass present in an amount and thickness sufficient to block substantially all flashlamp light from contacting said sealing means, whereby degradation of said sealing means is precluded and deterioration of said reflector powder resulting from leakage of water-coolant into contact therewith is prevented.

10. A solid state optical pumping laser as recited by claim 1, wherein said barrier means comprises a aluminum oxide ceramic having a density from about 3.7 to about 3.8 grams per cubic centimeter, said aluminum oxide ceramic being present in an amount and thickness sufficient to block substantially all flashlamp light from contacting said sealing means, whereby degradation of said sealing means is precluded and deterioration of said reflector powder resulting from leakage of water-coolant into contact therewith is prevented.

11. A solid state optical pumping laser as recited by claim 1, wherein said barrier means comprises molybdenum present in an amount and thickness sufficient to block substantially all flashlamp light from contacting said sealing means, whereby degradation of said sealing means is precluded and deterioration of said reflector powder resulting from leakage of water-coolant into contact therewith is prevented.

12. A solid state optical pumping laser as recited by claim 1, wherein said barrier means comprises a smokey quartz present in an amount and thickness sufficient to block substantially all flashlamp light from contacting said sealing means, whereby degradation of said sealing means is precluded and deterioration of said reflector powder resulting from leakage of water-coolant into contact therewith is prevented.

13. A solid state optical pumping laser as recited by claim 1, wherein said reflector material comprises barium sulfate powder.

14. A solid state optical pumping laser as recited by claim 1, wherein said barrier means comprises an opaque fused silica block thermally fused to a cavity-forming transparent fused silica structure at inlet and outlet ends thereof, thereby forming a shielded laser cavity insert.

* * * * *